United States Patent Office 3,055,578
Patented Sept. 25, 1962

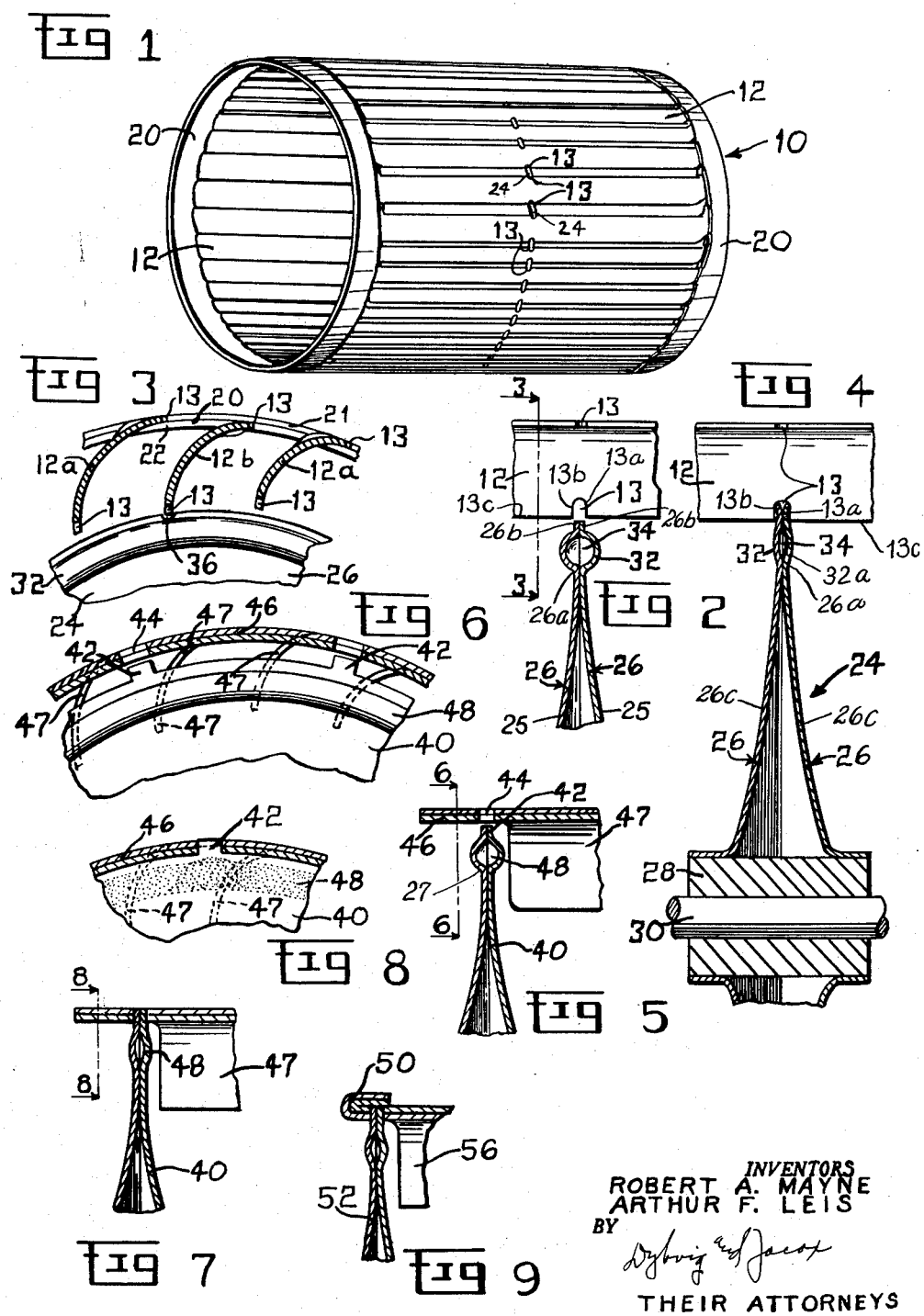

3,055,578
BLOWER ROTOR
Robert A. Mayne and Arthur F. Leis, Dayton, Ohio; Ruth D. Mayne, executrix of said Robert A. Mayne, deceased
Original application Oct. 12, 1953, Ser. No. 385,526. Divided and this application Aug. 5, 1958, Ser. No. 753,246
6 Claims. (Cl. 230—134)

This invention relates to a rotor. This invention relates particularly to a centrifugal type of blower rotor, however, the invention is not so limited, in that it may be used in other types of machines and for other purposes.

This is a divisional application of our application Serial No. 385,526, filed October 12, 1953, now Patent No. 3,021,591, for Blower Rotor and Method of Making Same.

An object of this invention is to provide a blower rotor comprising a single support wheel attached near the center of the rotor blades.

Other objects and advantages reside in the construction of parts, the combination thereof and the mode of operation, as will become more apparent from the following description.

Referring to the drawings,

FIGURE 1 is a perspective view of a blower rotor provided with a single rotor wheel constructed according to this invention.

FIGURE 2 is a fragmentary side sectional view, disclosing a step in the method of attachment of blower blades of a rotor to a support wheel according to this invention.

FIGURE 3 is a sectional view taken substantially on the line 3—3 of FIGURE 2.

FIGURE 4 is a fragmentary side sectional view showing another step in the method of attachment of the blower blades of a rotor to a support wheel, according to this invention.

FIGURE 5 is a side sectional view showing a step in the attachment of an end rim of a blower rotor to a rotor support wheel, according to this invention.

FIGURE 6 is a sectional view taken substantially on the line 6—6 of FIGURE 5.

FIGURE 7 is a side sectional view, disclosing another step in the attachment of an end rim of a blower rotor to a rotor support wheel, according to this invention.

FIGURE 8 is a sectional view taken substantially on the line 8—8 of FIGURE 7.

FIGURE 9 is a side sectional view disclosing the attachment of a rotor support wheel to another type of rotor end rim, according to this invention.

Figure 10:
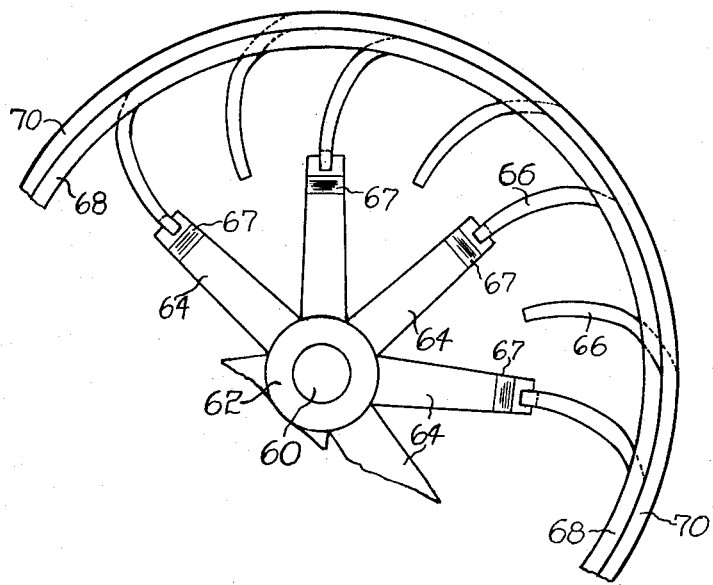
FIGURE 10 is a fragmentary end view of another modification of a blower rotor of this invention.

In the drawings, reference numeral 10 represents a blower rotor provided with a single support wheel constructed according to this invention. The rotor 10 is provided with a plurality of blades 12 which are formed from a single sheet of metal similar to the manner disclosed in United States Letters Patent No. 2,431,647, issued to joint inventors, one of whom is an applicant in this application. The sheet from which the blades 12 are formed is cut with uniformly spaced transverse incisions extending to points adjacent the two side edges of the sheet.

These transverse incisions form the sheet into strips which are retained by the uncut side edges. Next a longitudinal row of small holes is formed in the sheet near the center thereof, so that each hole is bisected by one of the incisions in the sheet. Thereby, notches or slots 13 are formed in the edges of the strips so as to provide shoulders 13a and 13b, which strips later become blades 12. The holes or slots 13 may be punched first and used as pilot holes for positioning the sheet in proper relation to the cutting tool used in making the transverse incisions. The strips are then bent arcuately and at an angle with respect to the end, thus forming blades 12.

The sheet is then formed into a plurality of convolutions, shown here as two convolutions, so that alternate blades 12a and 12b extend from separate convolutions, as disclosed in FIGURE 3. The uncut edge portions of the sheet, which are formed into convolutions 21 and 22, form end rings 20. Blades 12b extend from convolution 22 and blades 12a extend from convolution 21.

A rotor support wheel 24 comprises two discs or plates 26 attached to a hub 28 through which extends a shaft 30. A protrusion or bead or out-of-plane deformation 32 is formed adjacent the periphery of each of the discs or plates 26. Both of the discs or plates 26 have substantially the same diameter. The two discs, 26, as clearly shown in FIGURE 4, converge from the hub 28 through conical portions 26c until the two discs come in contact with each other at 26a, shown in FIGURES 2 and 4. Immediately beyond the circular contact area 26a, the protrusions 32 are formed, forming a cylindrical tube 34. Beyond this tube portion 34, annular flanges 26b project radially from the tubular portion. The flanges 26b, before collapsing the tube 34 as clearly shown in FIGURE 2, are parallel to each other and contact each other. The converging portions extending outwardly from the hub form a reinforced conic portion 25 giving rigidity to the wheel. When the discs 26 are assembled upon the hub 28 and attached thereto, the protrusions 32 and the discs 26 form a tubular bead 34 in the wheel 24 adjacent the periphery thereof. The wheel 24 is then positioned within the rotor blades approximately at the longitudinal center thereof, so that the outer edge that is, the annular flanges 26b of the wheel 24 are aligned with the slots or notches 13 formed in the blades 12, as best shown in FIGURE 2. The protrusions 32 forming nearly right angles with the flanges 26b, and forming the tube 34, are then forced, pressed or squashed one toward the other around the periphery of the wheel 24 by any suitable means. The tube 34 is substantially eliminated and substantially parallel portions 32a are formed from the arcuate walls 32. Thus, the outside diameter of the wheel 24 becomes greater and the circumferential edges of the wheel move into the notches 13 of the blades 12, as shown in FIGURE 4. FIGURE 4 clearly shows that the circumferential edges of the discs or plates 26 bend and diverge one from the other by spreading or moving axially and outwardly as the tube 34 is collapsed. Thus these circumferential edges of the discs or plates 26 firmly and lockingly engage the blades 12 within the notches 13. The flanges 26 frictionally engage the plates and opposed shoulders 13a and 13b. Due to the fact that the convolution 22 lies within the convolution 21, the blades 12b extend farther toward the center of the wheel 24 a distance substantially equal to the thickness of the metal used in forming the convolution. To compensate for this difference, the edge of the wheel 24 may be formed with notches 36 to receive the blades 12b, as shown in FIGURE 3.

Obviously, the axial or lateral movement of the outer margins of the flanges 26 is limited by the flanges engaging the shoulders 13a and 13b, the edges of the flanges being free to spread axially between adjacent blades without restriction.

The wheel 24 is thus firmly and rigidly secured to the blower blades 12, as disclosed in FIGURE 4. The rotor blades 12, including the end rings 20, are supported by the wheel 24. The shaft 30 may therefore be employed to transmit power to revolve the rotor blades 12.

The single wheel 24, positioned intermediate the ends of the rotor blades 12, supports the entire revolving structure.

A preferred modification in the construction of the blower rotor is that of securing a wheel member 40 to each end ring of the blades. As disclosed in FIGURES 5 and 6, the wheel member 40 is provided around its periphery with lugs 42 which are adapted to snugly engage slots 44 of an end ring 46 at each end of blades 47. A tubular bead 48 is formed around the wheel 40 adjacent the outer edge thereof before the wheel is inserted within the end ring 46. This bead has substantially a toroidal configuration. Then the wheel 40 is aligned within the end ring 46, so that the slots 44 of the end ring are aligned with the lugs 42 of the wheel 40. Next, the side portions of the tubular bead 48 are forced one toward the other by any suitable means, causing the side walls of the tubular bead 48 to partially collapse and causing the diameter of the wheel 40 to increase, thus forcing the lugs 42 to move into the slots 44, as shown in FIGURES 7 and 8.

When a wheel, such as wheel 40, is secured to an end ring 46, there is usually no wheel used at the center of the blades, as described with respect to FIGURES 1, 2, 3 and 4. Therefore, it is not necessary to form notches in the blades of the rotor. However, when no wheel is secured at the center of the blades, two wheels are employed and one is secured to each end ring 46 in a method as described with respect to FIGURES 5, 6, 7 and 8.

If it is desired to fold an end ring 50, as shown in FIGURE 9, a support wheel 52 can be secured to the ring 50 at each end of the blades 56 in a manner similar to that described with respect to the wheel 40 and the end ring 46.

Shown in FIGURE 10 is a fragmentary end view of another modification of a blower rotor of this invention. A shaft 60 supports a hub 62. Attached to the hub 62, integrally or in any other suitable manner, are a plurality of spokes 64. There are a plurality of blades 66, some of which are notched and contact the spokes 64. A protuberant bead 67 near the end of each spake 64 is squeezed to move the end of the spoke into the notch of the blade radially adjacent thereto. The blades 66 are formed from sheet metal convolutions 68 and 70 as described above with respect to convolutions 20 and 21.

Thus, it may be understood that a rotor constructed according to this invention is of simple, inexpensive, rugged construction. No welding or riveting of the rotor wheel to the blades or to the end rings is required. A wheel may be firmly secured at the center or at any other portion of the blades in a simple manner and at low cost.

The method disclosed herein by which a wheel, or a plurality of wheels, is secured within a cylindrical section may be employed in any type of rotor apparatus regardless of whether it is a blower or electrical equipment or any other type of apparatus. The method may be employed whether the cylindrical section is produced by convolutions of a single sheet, or produced by any other method. The method disclosed herein may be employed if the wheel section is composed of disc sections such as shown, or if the wheel is composed of spoked elements. The method disclosed herein may also be employed in the manufacture of other devices not circular or cylindrical in shape. For example, the method disclosed may be employed in the production of any type of support and the attachment of the support to any type of member.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. The combination of a center disc support with a blower wheel having a plurality of inwardly directed blades, each of said blades having closely spaced shoulders in the inner margins thereof, said disc support including a pair of disc members, each of said disc members having conically shaped circular center supporting portions, the outer margin of the center supporting portion of one disc member engaging the outer margin of center supporting portion of the other disc member, each of the disc members having a radially disposed portion extending beyond the center supporting portion, the radial length of each center supporting portion being greater than the radial length of the radially disposed portion, the radially disposed portions extending substantially parallel to each other, and spreading marginal flange portions engaging the shoulders of the blades so as to provide a pair of spaced contacts between the discs and each blade.

2. A center disc according to claim 1, wherein the shoulders of the blades consist of notches.

3. A center disc according to claim 1, wherein the margins of the center discs are notched so as to provide recesses into which the inner margins of the blades are seated.

4. The combination of a supporting mechanism with a blower wheel mounted upon a shaft, said blower wheel having a plurality of inwardly directed blades, each of said blades having closely spaced abutment areas in the inner margins thereof, said supporting mechanism including a pair of sheet metal members, each of the sheet metal members having centrally disposed portions converging from the shaft outwardly until meeting in a radially disposed contact area, said sheet metal members having diverging flange portions beyond the radially disposed contact area, the outer margins of the diverging flange portions engaging the abutment areas of the blades so as to support the blades in two spaced areas of each, said flanges being biased outwardly against said abutment areas.

5. The combination of a centrifugal blower rotor with a pair of supporting discs, said centrifugal blower rotor including a cylindrically shaped blade section provided with a plurality of blades, the inner margin of each blade being provided with a pair of closely spaced shoulders, said supporting discs including a pair of sheet metal disc members, each of said disc members including a conic center portion, the center portions converging from the center so as to butt each other, the conic portions merging into a pair of substantially radially disposed ring portions extending substantially parallel to each other, the ring portions merging into diverging flange portions, the edges of the flange portions firmly engaging the shoulders of the blades in two spaced areas to provide a two point contact of the discs with the blower rotor.

6. A pair of support blanks adapted for use upon expansion in supporting a blower wheel upon a shaft, said support blanks including a pair of sheet metal discs, each of said discs including a conic portion, the outer margins of the conic portions contacting each other along a circular area, means for holding the blanks together, each disc having an outwardly directed protrusion beyond the circular area, the protrusion of one disc contacting the protrusion of the other disc along two circular areas, the inner circular contacting area being the same as the circular area of the contacting area of the conic portions of the disc, the outer contacting area of the protrusions merging into flange portions forming the sole outer margin of the discs, the outer flange portions of the disc contacting each other throughout the entire portions of the disc extending beyond the protrusions in a plane normal to the shaft supporting the disc, the radial length of the protrusions and the flange portions being a minor fraction of the radial length of the conic portions.

(References on following page)

References Cited in the file of this patent

UNITED STATES PATENTS

| | | | |
|---|---|---|---|
| 766,593 | Cheshire | Aug. 2, | 1904 |
| 775,979 | Lachman | Nov. 29, | 1904 |
| 843,001 | Clark | Feb. 5, | 1907 |
| 882,521 | Jude | Mar. 17, | 1908 |
| 900,739 | Jude et al. | Oct. 13, | 1908 |
| 903,532 | Anderson | Nov. 10, | 1908 |
| 978,036 | Klahn | Dec. 6, | 1910 |
| 1,085,325 | Cubelic | Jan. 27, | 1914 |
| 1,676,874 | Shoemaker | July 10, | 1928 |
| 1,724,604 | Lambert | Aug. 13, | 1929 |
| 2,010,099 | Lyon | Aug. 6, | 1935 |
| 2,125,697 | Swingle et al. | Aug. 2, | 1938 |
| 2,240,238 | Baker | Apr. 29, | 1941 |
| 2,254,376 | Lyon | Sept. 2, | 1941 |
| 2,304,581 | Lyon | Dec. 8, | 1942 |
| 2,330,228 | Lyon | Sept. 28, | 1943 |
| 2,537,805 | Wilken | Jan. 9, | 1951 |

FOREIGN PATENTS

| | | | |
|---|---|---|---|
| 372,849 | Great Britain | May 19, | 1932 |
| 670,392 | Great Britain | Apr. 16, | 1952 |